United States Patent [19]

Garretto et al.

[11] Patent Number: 4,991,683

[45] Date of Patent: Feb. 12, 1991

[54] ANTI-THEFT VEHICLE SYSTEM

[75] Inventors: Michael A. Garretto, North Melbourne; Warren A. M. Howitt, Ivanhoe; Edward Vanda, Ringwood, all of Australia

[73] Assignee: Fail Proof Anti Theft System Pty. Ltd., North Melbourne, Australia

[21] Appl. No.: 397,481

[22] PCT Filed: Feb. 3, 1988

[86] PCT No.: PCT/AU88/00030

§ 371 Date: Aug. 17, 1989

§ 102(e) Date: Aug. 17, 1989

[87] PCT Pub. No.: WO88/06110

PCT Pub. Date: Aug. 25, 1988

[30] Foreign Application Priority Data

Feb. 20, 1987 [AU] Australia ............... PI0467
Nov. 11, 1987 [AU] Australia ............... PI5365

[51] Int. Cl.5 ............................................. B60R 25/04
[52] U.S. Cl. ................................... 180/287; 70/243; 307/10.2; 307/10.4; 340/825.56
[58] Field of Search ............... 180/287; 340/309.15, 340/438, 825.56; 307/10.4, 10.2; 70/243

[56] References Cited

U.S. PATENT DOCUMENTS

| 3,544,804 | 1/1970 | Gaumer et al. | 180/287 |
| 3,619,633 | 1/1970 | Brandon | 180/287 |
| 3,796,889 | 6/1974 | Fradkin | 361/172 |
| 3,968,666 | 5/1977 | MacKinnon | 70/243 |
| 3,987,408 | 10/1977 | Sassover et al. | 180/287 |
| 4,107,962 | 11/1978 | MacKinnon | 70/243 |
| 4,288,778 | 9/1981 | Zucker | 180/287 |
| 4,342,024 | 9/1982 | Rossi | 307/10.4 |
| 4,553,511 | 11/1985 | Hayakawa | 180/287 |

FOREIGN PATENT DOCUMENTS 2079837 1/1982 United Kingdom.

Primary Examiner—Richard A. Bertsch
Attorney, Agent, or Firm—Fleit, Jacobson, Cohn, Price, Holman & Stern

[57] ABSTRACT

An anti-theft vehicle system comprises a relay (R1) which shuts off power to an engine coil (14), fuel pump (16) or fuel flow valve (50) to prevent the engine from starting until the reset device in the form of a switch (S1) or a keyboard (150) is activated. Relay (R1) is controlled by a processor (100) which is coupled to a keyboard (150) so that when a code is keyed into the keyboard (150) the processor outputs a signal to the relay to cause the relay to supply power to the engine coil (14), fuel pump (16) or flow valve (50).

8 Claims, 3 Drawing Sheets

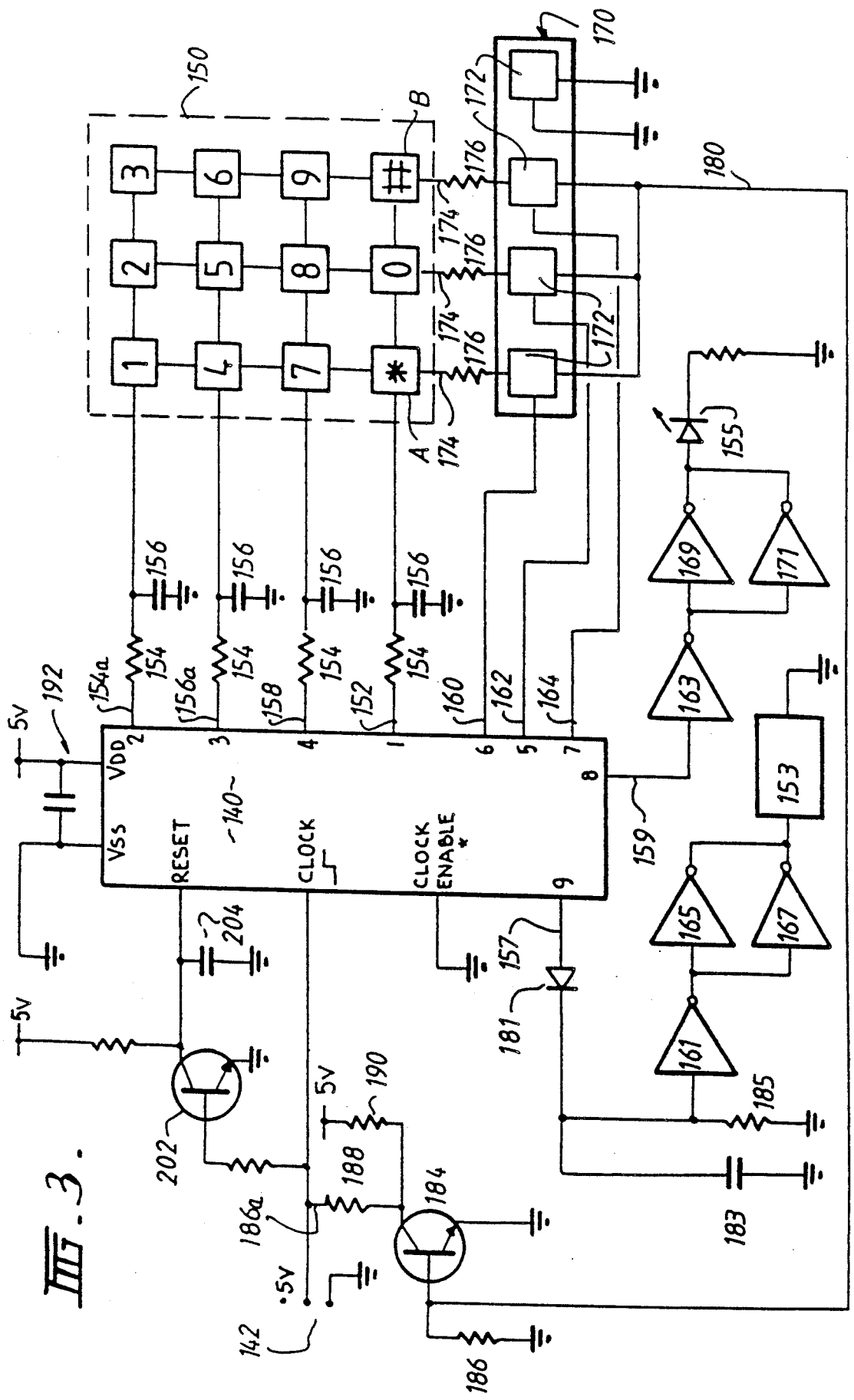

ANTI-THEFT VEHICLE SYSTEM

BACKGROUND OF THE INVENTION

This invention relates to an anti-theft vehicle system.

Many methods are used in order to prevent the theft of vehicles. The most common method is to utilize an alarm which sounds when a person attempts to gain unauthorized entry into a vehicle. The major problem with most alarm systems, apart from their complexity and their expense, is that they require actuation when an owner leaves his or her vehicle.

BRIEF SUMMARY OF THE INVENTION

The object of this invention is to provide a simple and inexpensive system for preventing the theft of a vehicle and which is automatically actuated when the vehicle is switched off.

The invention may be said to reside in an anti-theft vehicle system comprising means to disrupt the power supply to one or more components of a vehicle engine to prevent the engine from operating when the vehicle is switched off and reset means for causing the means to disrupt the power supply to the component to reconnect the power supply when it is desired to restart the vehicle.

Since the invention incorporates a means which disrupts the power supply to the engine the vehicle cannot be started until action is taken to cause the means to restore power to the engine. Since power to the engine can be easily disrupted the system can be built into a vehicle and is not expensive to produce or complicated to manufacture. Further since the power supply is disrupted when the vehicle is switched off it is not necessary to remember to switch a device on or off in order for the anti-theft system to be actuated.

Preferably the means which disrupts power to the engine disrupts the supply of electric power to a coil of the engine and also to an electric fuel pump which supplies fuel to the engine. If a vehicle is not supplied with an electric fuel pump preferably a flow switch is provided in the fuel line and the disruption of the power to the flow switch causes the fuel line to be blocked to prevent the flow of fuel to the engine.

Preferably the means which disrupts the power to the engine comprises a relay which, upon turning off an ignition switch with a key, opens the power line to the coil, fuel pump or flow switch which thereby disrupts the supply of power to the coil, fuel pump or flow switch.

Preferably the reset means is a reset switch which must be reset before power can be resupplied to the coil, fuel pump or flow switch and preferably a by-pass circuit is provided which has a switch which enables the system to be short circuited in the event that it is necessary to turn off the ignition switch but enable the vehicle to be driven by others without the need to reset the reset switch.

In an alternative embodiment the reset means comprises a keyboard which is coupled to a processor means, the keyboard being adapted to have a code entered into the keyboard such that the processor upon recognition of the code, outputs a signal to the relay to reconnect the power supply to the one or more components of the vehicle engine.

In another aspect the invention may be said to reside in an anti-theft system for a vehicle comprising an actuating means for location in an ignition or coil line in a vehicle the actuating means being adapted to open and close the ignition line to disrupt or supply power to a component of the engine, and a switch means for location in a power supply line, the power supply line coupling the power side of the ignition line to the actuating means for powering the actuating means, wherein upon turning off the ignition, power supply on the power supply line is disrupted to cause the actuating means to open the ignition line and upon turning on the ignition and actuating the switch means, power is supplied to the actuating means to cause the actuating means to close the ignition line to enable power to be supplied on the ignition line to the component of the vehicle.

In a further aspect the invention may be said to reside in a vehicle having an anti-theft system as described hereinabove.

The invention also provides an anti-theft ignition system for a vehicle comprising an input means for receiving a code, processor means coupled to the input means for receiving signals indicative of said code from the input means, switching means coupled to the processor means for receiving an output from the processor means when a predetermined code is inputted into the input means, and for allowing power and/or fuel to be supplied to a vehicle engine to enable the vehicle engine to be started and the vehicle to be driven.

Preferably, the input means comprises a keyboard and the processor means outputs the output to the switching means when the vehicle ignition is switched on for a predetermined period after the vehicle engine stops, without the need to input the code into the input means, and wherein the input means can receive a further code to cause the processor means to output the output signal, without the need to input the first mentioned code into the input means, when the vehicle ignition is switched on until said further code is cancelled by an input into the input means.

BRIEF DESCRIPTION OF THE DRAWINGS

A preferred embodiment of the invention will now be described with reference to the accompanying drawings wherein;

FIGS. 2 and 3 are circuit diagrams which show a second embodiment of the invention.

DETAILED DESCRIPTION

Figure 1:
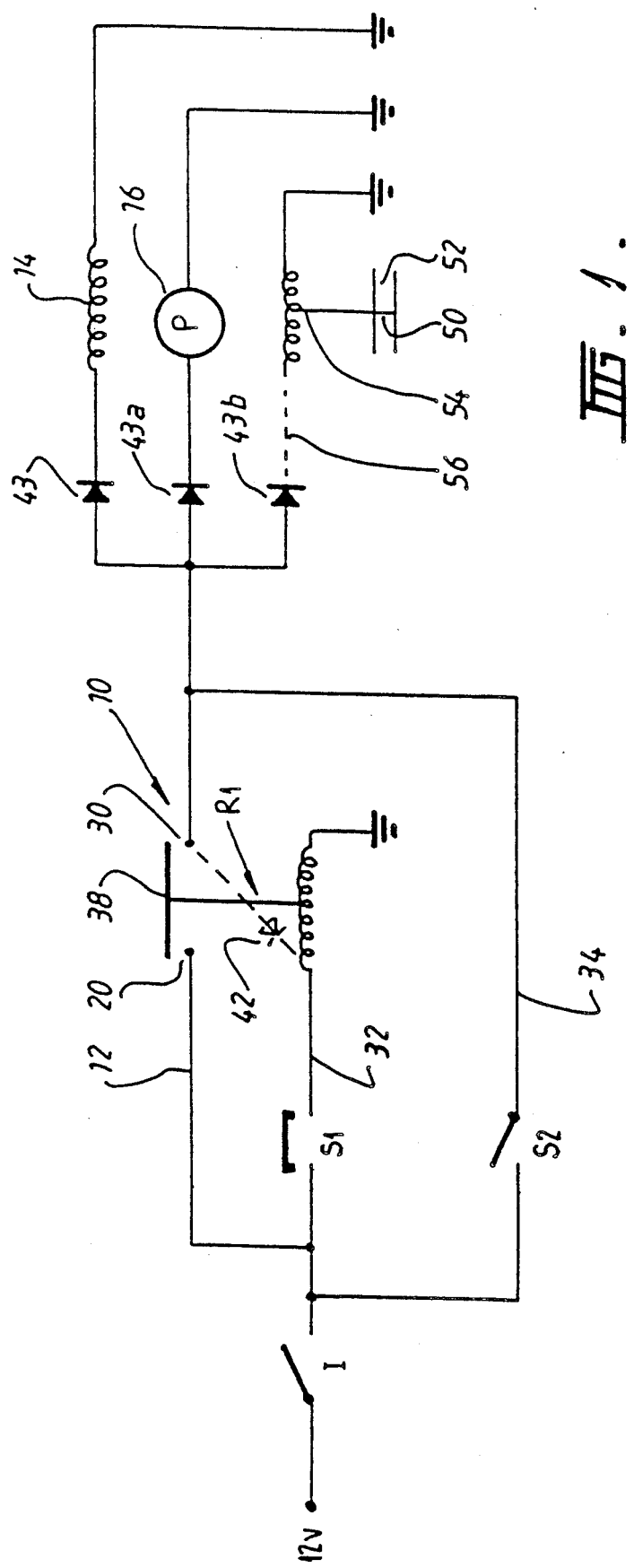
FIG. 1 is a circuit diagram which shows a first embodiment of the invention.

With reference to the accompanying drawing, an anti-theft system 10 is shown which comprises an ignition or coil line 12 which extends from an ignition switch I to an ignition coil 14 and a fuel pump 16 of a vehicle engine. The other sides of the coil 14 and pump 16 are connected to ground. The line 12 is provided with a terminal 20 and a terminal 30 which are bridged by a relay R1. Preferably the relay is a self locking mini signal relay made by Hella Australia Pty. Ltd. (Part No. 3082). The relay R1 is powered by line 32 which is connected to the relay R1 and to the ignition switch I. The line 32 includes a reset switch S1. A bypass circuit line 34 is provided between the ignition switch I and the ignition coil 14 and fuel pump 16. The line 34 effectively short-circuits the relay R1 and is provided with a toggle switch S2 which is normally open.

When the car is in normal use the terminal 20 and 30 are bridged by contact element 38 of the relay R1. Power is therefore supplied on the ignition or coil line 12 to the ignition coil 14 and fuel pump 16 as is usual. When the car is parked and the ignition is turned off the supply of power on line 12 is disrupted and therefore the supply of power to the relay R1 is disrupted. The disruption of power supply to the relay R1 causes the relay R1 to open to remove the contact element 38 from terminals 20 and 30 to thereby open the ignition line 12. Since the relay R1 is open if someone does gain access to the vehicle and switches the ignition on, power will not be supplied to the ignition coil 14 or fuel pump 16 since the terminals 20 and 30 are not bridged by the contact element 38.

The reset switch S1 is adapted to be hidden inside the vehicle where it can be readily accessed by the owner of the vehicle and reset to close the switch S1. In order to start the vehicle the ignition is turned on by an ignition key and the hidden reset switch S1 is depressed. When the switch S1 is depressed power is supplied to the relay R1 through line 32 and therefore the relay R1 is closed to bridge the terminals 20 and 30 to allow power to be supplied to the ignition coil 14 and fuel pump 16 on line 12. Since the relay R1 is self locking the contacts 20 and 30 remain bridged when the reset switch is released and remain bridged until power on line 12 is disrupted by switching off the ignition. The reset switch S1 can be hidden under the carpet of the vehicle where it can be actuated by the foot of the owner when he starts the car, or in the dashboard of the car, or in the roof of the vehicle. Indeed, the reset switch S1 can be hidden anywhere in the vehicle where it is most conveniently situated in a position where it can be readily reached by the driver in his normal seated position. The object of the reset switch S1 is to provide a hidden switch which only the driver knows of and which only the driver knows must be reset before the vehicle can be started.

The by-pass line 34 is provided to enable the car to be left in a car park or in other environments where it must be driven by another person without the need to tell the other person of the reset switch S1. In order to drive the car in such environments, a hidden toggle switch S2 which is normally open is closed to complete the circuit from the ignition switch I to the ignition coil 14 and fuel pump 16. Thus, when the ignition switch is closed power is supplied from the ignition switch via the by-pass circuit 34 to the ignition coil 14 and fuel pump 16. This will enable car park attendants and other authorized people to drive the vehicle without the need to inform those people of the position or purpose of the reset switch S1 or toggle switch S2.

Preferably a diode 42 is located between the contact 30 and the power side of the relay R1 in order to protect the system in the event that a person attempts to "hotwire" the motor vehicle. Furthermore a second diode 43 is connected between the ignition switch I and the coil 14 to prevent power being supplied to the engine if an attempt is made to "hot wire" the engine.

In vehicles in which an electric fuel pump is used a diode is connected in the line thereto and where an electric fuel pump is not used a flow switch 50 may be provided in fuel line 52. The flow switch is actuated by a solenoid 54 coupled to line 56 which in turn is coupled to the ignition or coil line 12. When the relay R1 is open power is disrupted to solenoid 54 and the flow switch 50 closes to shut off flow of fuel through the fuel line. Diodes 43a and 43b are connected to the pump 16 and switch 50 respectively to prevent hot wiring of those components.

In yet a further embodiment two reset switches could be used with one of the switches providing a delay of, for example 10 to 15 seconds, to depress the second switch and start the car.

In another embodiment (not shown) switch S1 could be coupled to an infra-red actuator and the owner of the vehicle could have an infra-red emitter, which he or she keeps with his or her keys, to control the actuator to cause the actuator to close switch S1 for a predetermined period of time to enable the engine to be started.

A second and more preferred embodiment of the invention is described with reference to FIGS. 2 and 3. In this embodiment the ignition line 12 is coupled to a single chip processor 100 on line 102 which includes a diode 104 and a transistor 106. The processor 100 is an integrated circuit 80C39. The ignition line 12 is coupled to the relay R1 which is shown schematically in FIG. 2 via a transistor 108. The transistor 108 is connected via resistor 110 to a second transistor 112 which in turn is coupled to the processor 100 on line 114. Power is supplied to the processor 100 from a vehicle battery via a diode 126, line 128, voltage regulator 130 which reduces the voltage from the vehicle battery to 5 volts and applies that voltage to the processor on line 132. A capacitor 205 is coupled to line 128 for momentarily stabilizing the power supply to the processor 100 in the event that the voltage supplied by the vehicle battery is disrupted or reduces below an acceptable level. The diode 126 protects the voltage regulator in the event of reverse connection of the vehicle battery. Power is also supplied to the processor 100 on line 116 via diode 118, resistor 120 and transistors 121 and 122. The transistors 121 and 122 are also coupled to lines 132 by line 133, 133' and resistors 135, 135'. A capacitor 134 is also coupled to line 132. The transistor 122 is connected to the processor 100 by a power off line 124. The processor 100 is coupled to an IC chip 140 (FIG. 3) which is an integrated circuit No. 4017 primarily adapted to scan a keyboard 150. The circuit 140 is coupled to the processor 100 via line 142 which comprises a signal line, a 5 volt supply line and a earthed grounded shield line.

The keyboard 150 is coupled to the circuit 140 by lines 152, 154a, and 156a. These lines are each provided with a resistors 154 and a capacitor 156.

The lines 160 to 164 are connected to an integrated circuit 170 which comprises four gates 172. Only three of the gates 172 are used in this embodiment of the invention and the fourth gate therefore has its input and output connected to ground. The gates 172 are each connected to the keyboard 150 by lines 174 and resistors 176. The output from each of the gates 172 is combined into line 180 which is connected to a base of transistor 184 which is also connected to ground via resistor 186. The emitter of the transistor 184 is connected to ground and the collector is connected to line 142 via line 186, and resistor 188 as well as to a five volt supply via resistor 190.

Power is supplied to the circuit 140 via a five volt supply as schematically shown at 192. The circuit 140 also has a buzzer 153 and a light emitting diode 155 connected to two of its parts via lines 157 and 159 and gates 161, 165, 167, and 163, 169, 171 respectively. These gates form a double inverter. Line 157 also has a pulse lengthening circuit formed of diode 181, capacitor 183 and resistor 185 for lengthening the pulse outputted from the circuit 140 so that when a line 157 goes high the buzzer sounds continuously. A clock circuit 175 allows processor 100 to generate a clock for internal operation and capacitors 177 are provided to prevent spurious signals. A reset circuit 179 is provided to start the processor when power is initially supplied.

The reset circuit 179 is also provided with a "watch dog timer" 250 which comprises two retriggerable monostable circuits 252 and 254. The circuit 252 is coupled to circuit 100 and is kept in the triggered state by an output from the circuit 100. If the output from the circuit 100 stops, the circuit 252 goes to its quiescent state thereby triggering circuit 254 which resets the circuit 100. Thus the circuit 100 can be reset by the circuit 179 if the 5 volt supply drops or if the output from the circuit 100 which is supplied to circuit 252 goes low indicating a fault in the operation of the circuit 100.

An EPROM 275 is coupled to circuit 100 via 8 bit latch 280. The latch 280 is time controlled by a signal on the ADDRESS LATCH ENABLE (ALE signal) output of the circuit 100 to cause information on the bus lines 290 to be received by the EPROM 275 and for data to be supplied to the circuit 100 via the bus 290. The EPROM 275 and latch 280 are interconnected by address lines 282 and the EPROM is connected to the circuit 100 by 4 address lines 284. (The circuit 100' in FIG. 2 is the circuit 100 which has been drawn adjacent to the EPROM 275 to show the interconnection for the ease of illustration).

A mode memory circuit 220 which is a nonvolatile RAM circuit x2444 made by X1COR is coupled to circuit 100 to store the information contained in the circuit 100 in the event of power loss. If power is lost line 116 goes low which stops transistor 121 from conducting to enable transistor 122 to conduct so that a low signal appears on line 124. This signal is received by the circuit 100 interrupt port to shut down the circuit 100. In the event of power disruption, capacitor 205 maintains circuit 100 operating for a small amount of time to ensure that the information contained in the circuit 100 is transferred to the circuit 220.

The embodiment of FIGS. 2 and 3 operates as follows. The processor 100 is programmed to output a signal on line 142 to cause that line to go low. This turns off transistor 202. Line 142 is maintained low for a sufficient period of time to enable capacitor 204 to charge to thereby reset the circuit 140. The processor 100 then outputs a signal on line 142 to cause that line to go high turning on transistor 202, taking circuit 140 out of the reset mode so that it can respond to its clock input on line 142. The circuit 140 then causes lines 152, 154a, 156a, 160, 162 and 164 to go low and high in a predetermined sequence so that the keyboard 150 can be read. The circuit 140 reads the keyboard 150 by causing one of the lines 152 to go high for a sufficient amount of time to charge its respective capacitor 156 and then quickly causes the other lines to go high for a short period of time sufficient to prevent charging of the respective other capacitors 156. The lines 160 to 164 are also caused to go high in turn so that if one of the keys in the row coupled to the capacitor which has charged is depressed the capacitor discharges through that key and through the gate 172 in the same column of keys to cause line 180 to go high. Once the circuit 140 has scanned through each of the lines 152 to 164 the line 142 is again caused to go low for sufficient time to turn transistor 202 off so that capacitor 204 is charged to reset the circuit 140. The scan is then repeated with another one of the lines 152 to 158 being held high for a sufficient amount of time to cause its transistor 156 to charge so that another depressed key in another line can be detected. This scanning procedure continues and the output on line 180 switches transistor 184 on so that line 142 goes low so that the processor 100 (FIG. 2) can receive signals from the keyboard 150 indicative of a certain number of keys being depressed on the keyboard to determine whether that code corresponds to a preprogrammed code in the processor 100.

Thus, a user of the vehicle turns the ignition key of the vehicle which causes a low signal to be supplied on line 102 to the processor 100. The processor 100 then reads the keyboard 150 in the above described manner to determine if a code inserted into the keyboard 150 by the driver matches a predetermined code in the processor 100. If the code does match a predetermined code in the processor 100 the processor 100 outputs a signal on line 114 which switches on transistor 112 to in turn switch on transistor 108 to cause power to be supplied on the ignition line 12 to relay R1. This causes the relay R1 to close so that power is supplied to the ignition coil 14, fuel pump 16 or fuel shut off valve 50 in the same manner as described with reference to FIG. 1.

In the event that a driver inputs a wrong numeral into the keyboard 150 the processor is programmed to take no further action and not to supply an output on line 114. The driver is then required to switch off the ignition key so that the line 102 goes high. This causes the processor 100 to output a signal on line 142 causing the circuit 140 to reset and again restart the scanning process of the keyboard 150. Once the user correctly inputs the code the processor 100 outputs a signal to cause line 114 to go high to in turn enable power to be supplied to the relay R1 as described above.

This embodiment of the invention is also provided with two other modes to enable the vehicle to be used by other people whilst being serviced or driven in a car park without those people having to know the driver's input code or to enable the driver to restart the engine in the event that the vehicle stalls in traffic or the like.

The service mode requires the driver to push the key labelled with reference no. A on keyboard 150. If this key is depressed the processor 100 will recongnize that key and when the ignition is turned on a low signal received on line 102 will cause line 114 to go high to enable power to be supplied to the relay R1. The processor 100 will remain in this mode until the key labelled B in keyboard 150 is depressed. When the key labelled B has been depressed the processor 100 goes back to its normal mode when it will read the keyboard 150 for the required code before outputting a high signal on line 114 to enable power to be supplied to the relay R1. When processor 100 is in this mode it also causes the circuit 140 to provide outputs to lines 157 and 159 to gates 161 and 163 so that power is supplied to buzzer 153 and diode 155 so as to provide an indication that the system is in the service mode.

The other mode enables a driver to immediately restart the car in the event of the car stalling. This mode includes a timing sequence in the processor 100 whereby once the vehicle has been placed in the normal running mode and power is disrupted to the vehicle in the event of the vehicle stalling or the like, the processor will still cause line 114 to go high in the event that the ignition is turned on within a period of, for example, 20 seconds after the processor 100 detects the disruption of power supply. Thus, if the vehicle does stall in traffic or any other conditions it can be turned on by simply turning the ignition key as is conventional. After a period of 20 seconds has elapsed the processor 100 then goes into the mode whereby a correct input into keyboard 150 is required before a high signal is applied to line 114 to cause power to be supplied to the relay R1. When the driver turns the vehicle off, transistor 106 stops conducting and line 102 goes high. This is sensed by the processor which causes line 114 to go low to shut off power to the relay.

As previosly described the system is provided with the mode memory circuit 220. This circuit remembers which mode the processor 100 was in the event of power disruption (which is sensed on power off line 124) to the system and to, upon resupply of power to the system, re-enter that mode into the processor 100 so that the processor 100 continues to operate in the correct mode. Therefore, if power is disrupted to the system for any reason, such as by faulty battery terminals or disconnection of those terminals or the like, the circuit 220 remembers the state at which the processor 100 was operating at the time of disruption to power and when power is supplied reprograms the processor 100. This enables easy reprogramming of the system in the event that a battery is removed or disconnected from the vehicle for any reason and also prevents theft of a vehicle by a thief tampering with the battery in order to disrupt supply of power to the system and hopefully place the system into a mode which will enable the thief to simply start the vehicle in the conventional way. Since the circuit 220 reprograms the processor 100 into the mode it was in when power was lost, if the vehicle is left standing in the normal security mode where a correct key entry is required to be inputted into keyboard 150 before the vehicle will start and power is disrupted, the processor 100 will, on being repowered, be reprogrammed into that mode to thereby prevent operation of the vehicle until the correct code is inputted into the keyboard 150.

Figure 2:
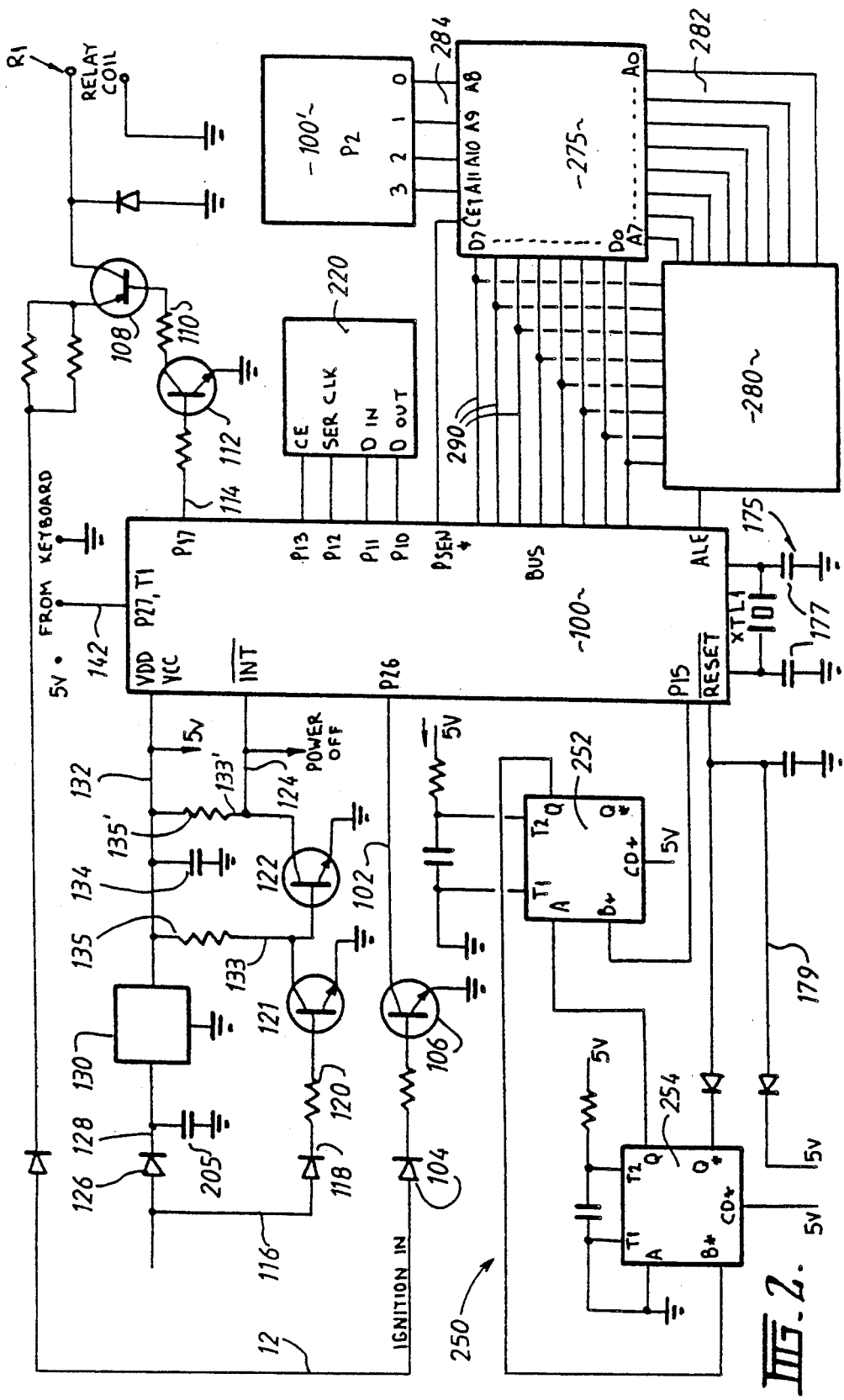

The circuit components shown in FIG. 2 are adapted to be located in a secure location to prevent tampering or access by a would-be thief. It is proposed that circuitry be contained in a secure container which is located beneath a plate in the boot of a vehicle or otherwise secured in the vehicle in a position where it cannot be tampered with and in further embodiments the circuitry may be integrated into the "black box" electronic control system of a vehicle.

In a further embodiment the system could comprise an infra-red sending unit located in the vehicle. The unit includes a keyboard into which a code is keyed by a user to cause the unit to emit an infra-red signal to a pickup unit which causes the terminals 20 and 30 to close to enable power to be supplied on coil or ignition line 12 to the coil etc. The sending unit could also enable the signal to be emitted when a different service code is inputted by the owner so that the terminals 20 and 30 are permanently closed until the owner cancels the service code so that the vehicle can be started by authorized people other than the owner without the owner having to disclose his or her code.

The preferred embodiment of the invention thereby provides a simple and economical manner of providing an anti-theft device which may be built into a vehicle and which can provide a substantial anti-theft measure in order to prevent the theft or unauthorized operation of the vehicle.

The program for operating the system is set out below (set out in machine language).

```
0000    04 0A FF 04 08 FF FF 93-89 80 D4 9F B8 25 B0 00
0010    E8 0E 27 D7 86 0A BB 02-B4 00 C6 2E 04 24 23 FF
0020    BB 02 94 00 D4 8B BB 02-23 00 94 00 04 60 BB 00
0030    B4 00 C6 60 99 7F B9 25-B1 05 B9 25 F1 07 A1 C6
0040    60 74 61 76 3A 54 4C 96-B0 04 9E 9A CF B8 24 F0
0050    17 A0 03 F6 E6 5A B0 00-04 1E 54 63 76 60 04 5A
0060    99 7F 54 43 9A CF 54 63-76 66 54 4C 96 B0 34 00
0070    76 60 FF D3 03 96 4B 9A-CF 8A 10 34 00 76 60 FF
0080    D3 03 C6 7B FF D3 05 96-4B 9A CF 8A 20 34 00 76
0090    60 D3 05 C6 8D FF D3 07-96 4B 8A 30 54 35 B8 24
00A0    B0 00 54 35 34 1A 76 34-D3 0B 96 A4 54 51 04 B2
00B0    54 35 B8 FF 54 63 76 60-54 00 76 60 18 F8 96 DC
00C0    54 79 76 60 14 EA 76 60-14 EA 76 60 54 79 76 60
00D0    14 EA 76 60 14 EA 76 60-54 79 76 60 34 1A 76 60
00E0    C6 B4 D3 0C 96 B4 54 5A-04 A4 54 00 76 F8 54 00
00F0    76 F8 54 00 76 F8 54 00-83 FF FF FF FF FF FF FF
0100    34 30 76 18 96 18 34 7E-76 18 96 18 34 A6 76 18
0110    96 18 34 CE 76 18 C6 00-AF 83 34 30 76 2E 96 2E
0120    34 7E 76 2E 96 2E 34 A6-76 2E 96 2E 34 CE AF 83
0130    9A 7F 54 70 76 79 8A 80-54 70 76 79 9A 7F 8A 80
0140    54 70 76 79 B9 7A 9A 7F-8A 80 9A 7F 8A 80 9A 7F
0150    8A 80 9A 7F 8A 80 0A AF-9A 7F 8A 80 0A AC 9A 7F
0160    8A 80 0A 2B 37 F2 6F FC-37 F2 70 FB F2 71 19 19
0170    19 9A 7F 54 70 76 79 F9-A3 83 00 0B 0B 0C 9A 7F
0180    54 70 76 79 8A 80 54 70-76 79 9A 7F 8A 80 9A 7F
0190    8A 80 54 70 76 79 B9 A2-9A 7F 8A 80 9A 7F 8A 80
01A0    24 52 00 01 02 03 9A 7F-54 70 76 79 8A 80 54 70
01B0    76 79 9A 7F 8A 80 9A 7F-8A 80 9A 7F 8A 80 54 70
01C0    76 79 B9 CA 9A 7F 8A 80-24 52 00 04 05 06 9A 7F
01D0    54 70 76 79 8A 80 54 70-76 79 9A 7F 8A 80 9A 7F
01E0    8A 80 9A 7F 8A 80 9A 7F-8A 80 54 70 76 69 B9 F2
01F0    24 52 00 07 08 09 FF FF-FF FF FF FF FF FF FF FF
0200    9A 7F 54 70 76 32 8A 80-54 70 76 32 9A 7F 8A 80
0210    9A 7F 8A 80 9A 7F 8A 80-9A 7F 8A 80 9A 7F 8A 80
0220    9A 7F 8A 80 9A 7F 8A 80-9A 7F 8A 80 9A 7F 8A 80
0230    54 70 9A 7F 83 89 80 54-3A 83 BB 00 23 FF 94 00
0240    D4 11 83 BB 00 23 00 94-00 D4 11 83 BB 01 B4 00
0250    83 BB 01 23 FF 94 00 D4-11 83 BB 01 23 00 94 00
0260    D4 11 83 74 76 8A 40 00-00 0A A5 B5 D2 6F A5 83
0270    BE 80 54 63 76 78 EE 72-83 74 00 76 7F 74 00 83
```

| | -continued |
|---|---|
| 0380 | FF FF FF FF FF FF FF FF-FF FF FF FF FF FF FF |
| 0300 | 9A 7F 54 70 76 5E 8A 80-54 70 76 5E 9A 7F 8A 80 |
| 0310 | 9A 7F 8A 80 9A 7F 8A 80-9A 7F 8A 80 9A 7F 8A 80 |
| 0320 | 9A 7F 8A 80 9A 7F 8A 80-9A 7F 8A 80 54 70 76 5E |
| 0330 | 54 70 76 5E 54 70 76 5E-54 70 76 5E 54 70 76 5E |
| 0340 | 54 70 76 5E 54 70 76 5E-54 70 76 5E 54 70 76 5E |
| 0350 | 54 70 76 5E 54 70 76 5E-54 70 76 5E 54 70 9A 7F |
| 0360 | 83 BA 64 BB 64 BC 05 74-76 54 63 76 6F 64 75 EC |
| 0370 | 67 EB 65 EA 63 83 99 DF-89 20 83 FF FF FF FF FF |
| 0380 | FF FF FF FF FF FF FF FF-FF FF FF FF FF FF FF FF |
| 0400 | D4 00 AA D4 3A 89 02 D4-74 99 FD D4 74 D4 74 99 |
| 0410 | F7 D4 4B 99 FD D4 74 89-02 D4 74 89 02 D4 74 FA |
| 0420 | 89 02 12 26 99 FD D4 74-89 02 32 2E 99 FD D4 74 |
| 0430 | 89 02 52 36 99 FD D4 74-89 02 72 3E 99 FD D4 74 |
| 0440 | 89 02 92 46 99 FD D4 74-89 02 B2 4E 99 FD D4 74 |
| 0450 | 89 02 D2 56 99 FD D4 74-89 02 F2 5E 99 FD D4 74 |
| 0460 | 89 02 12 66 99 FD D4 74-89 02 32 6E 99 FD D4 74 |
| 0470 | 89 02 52 76 99 FD D4 74-89 02 72 7E 99 FD D4 74 |
| 0480 | 89 02 92 86 99 FD D4 74-89 02 B2 8E 99 FD D4 74 |
| 0490 | 89 02 D2 96 99 FD D4 74-89 02 F2 9E 99 FD D4 74 |
| 04A0 | 99 F7 83 FF FF FF FF FF-FF FF FF FF FF FF FF FF |
| 04B0 | FF FF FF FF FF FF FF FF-FF FF FF FF FF FF FF FF |
| 0500 | D4 00 D4 4B 89 02 D4 74-D4 74 89 01 D4 74 BB 00 |
| 0510 | 09 53 01 C6 16 1B D4 74-09 53 01 C6 1E 1B D4 74 |
| 0520 | 09 53 01 C6 26 1B D4 74-09 53 01 C6 2E 1B D4 74 |
| 0530 | 09 53 01 C6 36 1B D4 74-09 53 01 C6 3E 1B D4 74 |
| 0540 | 09 53 01 C6 46 1B D4 74-09 53 01 C6 4E 1B D4 74 |
| 0550 | 09 53 01 C6 56 1B D4 74-09 53 01 C6 5E 1B D4 74 |
| 0560 | 09 53 01 C6 66 1B D4 74-09 53 01 C6 6E 1B D4 74 |
| 0570 | 09 53 01 C6 76 1B D4 74-E7 53 02 C6 7E 1B D4 74 |
| 0580 | 09 53 01 C6 86 1B D4 74-D4 74 99 F7 FB 03 F8 F6 |
| 0590 | 94 23 00 83 23 FF 83 FF-FF FF FF FF FF FF FF FF |
| 05A0 | FF FF FF FF FF FF FF FF-FF FF FF FF FF FF FF FF |
| 0600 | D4 3A 89 02 D4 74 99 FD-D4 74 89 02 D4 74 99 F7 |
| 0610 | 83 D4 3A 89 02 D4 74 99-FD D4 74 D4 74 99 F7 D4 |
| 0620 | 3A 99 FD D4 74 D4 74 89-02 D4 74 99 F7 BD 64 BC |
| 0630 | 10 00 00 00 EC 31 ED 2F-83 83 99 FB 89 08 89 02 |
| 0640 | D4 74 D4 74 D4 74 D4 74-D4 74 83 99 FB 89 08 2B |
| 0650 | 89 02 D4 74 12 58 99 FD-D4 74 89 02 32 60 99 FD |
| 0660 | D4 74 89 02 52 68 99 FD-D4 74 89 02 72 70 99 FD |
| 0670 | D4 74 2B 83 00 89 04 99-FB 00 83 BE 64 BD 64 BC |
| 0680 | 10 00 00 00 EC 81 ED 7F-33 7D 83 BF 1E BE 64 BD |
| 0690 | 64 BC F0 00 00 00 EC 93-ED 91 EE 8F EF 8D 83 BE |
| 06A0 | 00 74 76 BF 00 9A BF 8A-40 EF A5 EE A1 83 0E |

We claim:

1. An anti-theft system for a vehicle having an engine and an ignition switch comprising:
   an actuating means in an ignition line in the vehicle;
   a normally open switch means in a power supply line for supplying power to said actuating means;
   at least two branch lines in said ignition line on the side of said actuating means opposite said ignition switch;
   an engine component connected in each branch line; and
   isolating means connected in each branch line for preventing power flow in a direction from the respective component to said actuating means but allowing power flow from said actuating means to said respective component and for preventing power from being supplied to one of said engine components in the event of hot-wiring another of said engine components to prevent said vehicle engine from starting, said actuating means being normally non-conducting to disrupt power supply to said components;
   so that turning on the ignition switch and actuation of said switch means to close the switch means supplies power to said actuating means to cause said actuating means to conduct power to said engine components, notwithstanding de-activation and opening of said switch means, and turning off the ignition switch disconnects ingition power supply to said actuating means in the ignition line to cause said actuating means to open said ignition line and stop conducting to said engine components, and said vehicle can only be restarted when said ignition switch and switch means are both closed.

2. The system as claimed in claim 1 wherein:
   said actuating means comprises a self-locking relay.

3. The system as claimed in claim 1 wherein:
   said switch means comprises a manually operated button which closes the switch thereof only when pressure is applied to the button and opens the switch thereof when the pressure is released.

4. The system as claimed in claim 2 wherein:
   said switch means comprises a manually operated button which closes the switch thereof only when pressure is applied to the button and opens the switch thereof when the pressure is released.

5. An anti-theft ignition system for a vehicle comprising:
   a keyboard for receiving a code;
   processor means electrically coupled to said keyboard for receiving signals indicative of said code from said keyboard;
   switching means electrically coupled to said processor means for receiving an output from said processor means when a predetermined code is inputted into said keyboard, and for allowing power to be supplied to a vehicle engine to enable the vehicle engine to be started and the vehicle to be driven, said processor means outputting said output to the switching means when the vehicle ignition is switched on for a predetermined period after the vehicle engine stops, without the need to input said code into said keyboard, and means for said keyboard to receive a further code to cause said processor means to output said output signal when the vehicle ignition is switched on until said further code is cancelled by an input into said keyboard.

6. An anti-theft ignition system for a vehicle comprising:

a keyboard for receiving a code;

processor means electrically coupled to said keyboard for receiving signals indicative of said code from said keyboard;

switching means electrically coupled to said processor means for receiving an output from said processor means when a predetermined code is inputted into said keyboard, and for allowing fuel to be supplied to a vehicle engine to enable the vehicle engine to be started and the vehicle to be driven, said processor means outputting said output to the switching means when the vehicle ignition is switched on for a predetermined period after the vehicle engine stops, without the need to input said code into said keyboard, and means for said keyboard to receive a further code to cause said processor means to output said output signal when the vehicle ignition is switched on until said further code is cancelled by an input into said keyboard.

7. The system as claimed in claim 5, wherein a mode memory circuit is electrically coupled to said processor so that in the event of power disruption to said processor, said processor supplies information contained in the processor to said mode memory circuit for storage and wherein said mode memory circuit supplies the processor with said information after power is resupplied to said processor means.

8. The system as claimed in claim 7, wherein a mode memory circuit is electrically coupled to said processor so that in the event of power disruption to said processor, said processor supplies information contained in the processor to said mode memory circuit for storage and wherein said mode memory circuit supplies the processor with said information after power is resupplied to said processor means.

* * * * *